United States Patent
Chen et al.

(10) Patent No.: US 10,579,583 B2
(45) Date of Patent: Mar. 3, 2020

(54) TRUE RANDOM GENERATOR (TRNG) IN ML ACCELERATORS FOR NN DROPOUT AND INITIALIZATION

(71) Applicant: International Business Machines Corporation, Armonk, NY (US)

(72) Inventors: Chia-Yu Chen, White Plains, NY (US); Pierce I-Jen Chuang, Briarcliff Manor, NY (US); Li-Wen Hung, Mahopac, NY (US); Jui-Hsin Lai, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 877 days.

(21) Appl. No.: 15/232,177

(22) Filed: Aug. 9, 2016

(65) Prior Publication Data

US 2018/0046597 A1 Feb. 15, 2018

(51) Int. Cl.
*G06F 7/58* (2006.01)
*G06F 15/78* (2006.01)
(Continued)

(52) U.S. Cl.
CPC ............ *G06F 15/7892* (2013.01); *G06F 7/58* (2013.01); *G06N 3/063* (2013.01); *G06N 3/082* (2013.01)

(58) Field of Classification Search
CPC ....... G06F 15/7892; G06F 7/58; G06N 3/082; G06N 3/063
(Continued)

(56) References Cited

U.S. PATENT DOCUMENTS 8,874,631 B2 * 10/2014 Matsumoto ............. G06F 7/588
   331/167
10,416,965 B2 * 9/2019 Chen ....................... G06F 7/582
(Continued)

FOREIGN PATENT DOCUMENTS

| EP | 1988450 A1 | 11/2008 |
|---|---|---|
| WO | 2005101194 A1 | 10/2005 |
| WO | 2014184721 A1 | 11/2014 |

OTHER PUBLICATIONS

Alimohammad, A., et al., "A Compact and Accurate Gaussian Variate Generator", IEEE Transations on Very Large Scale Integratoin (VLSI) Systems, May 2208, pp. 517-527, vol. 16, No. 5.
(Continued)

*Primary Examiner* — Tan V Mai
(74) *Attorney, Agent, or Firm* — Scully, Scott, Murphy & Presser, P.C.; Vazken Alexanian (57) ABSTRACT

A random number signal generator used for performing dropout or weight initialization for a node in a neural network. The random number signal generator includes a transistor which generates a random noise signal. The transistor includes a substrate, source and drain regions formed in the substrate, a first insulating layer formed over a channel of the transistor, a first trapping layer formed over the first insulating layer, a second insulating layer formed over the first trapping layer, and a second trapping layer formed over the second insulating layer. One or more traps in the first and second trapping layers are configured to capture or release one or more carriers flowing through the channel region. The random noise signal is generated as a function of one or more carrier being captured or released by the one or more traps.

20 Claims, 8 Drawing Sheets

(51) Int. Cl.
*G06N 3/063* (2006.01)
*G06N 3/08* (2006.01)

(58) Field of Classification Search
USPC .......................................................... 708/255
See application file for complete search history.

(56) References Cited

U.S. PATENT DOCUMENTS

| | | |
|---|---|---|
| 2004/0064491 A1 | 4/2004 | Rarick |
| 2009/0165086 A1 | 6/2009 | Trichina et al. |
| 2012/0276974 A1 | 11/2012 | Nilsson et al. |
| 2014/0146607 A1* | 5/2014 | Nagai ....................... G06F 7/58 365/185.04 |
| 2015/0074159 A1 | 3/2015 | Poschmann et al. |

OTHER PUBLICATIONS

Bossuet, L., et al., "Architectures of Flexible Symmetric Key Crypto Engines—A Survey: From hardware Coprocessor to Multi-Crypto-Processor System on Chip", ACM Computing Surveys, Aug. 2013, 33 pages, vol. 45, No. 4, Article 41.
Chen, T., et al., "DianNao: A Small-Footprint High-Throughput Accelerator for ubiquitous Machine-Learning", ASPLOS '14, Mar. 1-5, 2014, 15 pages.
Fung, E., et al., "ASIC Implementation of a High Speed WGNG for Communication Channel Emulation", SIPS 2004, pp. 304-309.
Romaniuk, R.S., "Biomedical, Artificial Intelligence and DNA Computing Photonics Applications and Web Engineering", WILGA May 2012, Photonics Applications in Astronomy, Communications, Industry, and High-Energy Physics Experiments 2012, Proc. of SPIE, 13 pages, vol. 8454.

* cited by examiner

TRUE RANDOM GENERATOR (TRNG) IN ML ACCELERATORS FOR NN DROPOUT AND INITIALIZATION

FIELD

The present disclosure relates to a random signal generator, and more particularly to, a true random number signal generator used for dropout or weight initialization in a neural network and a method of operating the generator.

BACKGROUND

Typically, random numbers (e.g., pseudo random number) are utilized as inputs for performing dropout and weight initialization in a neural network. Correlation and the unexpected period of the random numbers could make learning (or training) of the neural network inefficient. This can be addressed by performing batch normalization on the input random numbers.

However, the batch normalization requires extra computation efforts for generating Gaussian probability distribution of random number signals, and thus, causes much computational time penalty of, e.g., about 30%.

Thus, there is a need for a true-random number generator providing random numbers with less correlation or expected period thereof to be used for performing dropout or weight initialization in the neural network.

SUMMARY

According to an aspect of the present invention, there is provided a random number signal generator for generating a random number signal used for performing dropout or weight initialization for a node in a neural network. The random number signal generator includes a transistor which generates a random noise signal. The transistor includes a substrate, source and drain regions formed in the substrate, a first insulating layer formed over a channel region of the transistor, a first trapping layer formed over the first insulating layer, a second insulating layer formed over the first trapping layer, and a second trapping layer formed over the second insulating layer. Each of the first and second trapping layers includes one or more traps. The one or more traps of the first and second trapping layers are configured to capture or release one or more carriers flowing through the channel region. In response to an applied signal, the random noise signal is generated as a function as the one or more carriers being captured or released by the one or more traps. A random probability distribution of the random noise signal is controlled using a magnitude of a gate voltage signal applied to the gate contact electrode.

In another aspect, there is provided a method for generating a random number signal used for performing dropout or weight initialization at a node within a neural network. The method includes configuring a transistor to generate a random noise signal. The transistor includes a substrate, source and drain regions formed in the substrate, a first insulating layer formed over a channel region of the transistor, a first trapping layer formed over the first insulating layer, and a second insulating layer formed over the first trapping layer, a second trapping layer formed over the second insulating layer. Each of the first and second trapping layers includes one or more traps. The method further includes applying a signal to the transistor, obtaining the random noise signal through at least one of a gate contact electrode formed in the gate conductive layer and a drain contact electrode formed in the drain region, and controlling a random probability distribution of the random noise signal using one of a magnitude of a gate voltage applied to the gate contact electrode. The random noise signal is generated as a function the one or more carriers being captured or released by the one or more traps.

In a further aspect, there is provided a neural network accelerator having a plurality of nodes and a plurality of random number signal generators. Each of the random number signal generators is used for performing dropout or weight initialization for each of the nodes. Each of the random number signal generators includes a transistor which generates a random noise signal. The transistor includes a substrate, source and drain regions formed in the substrate, a first insulating layer formed over a channel region of the transistor, a first trapping layer formed over the first insulating layer, a second insulating layer formed over the first trapping layer, and a second trapping layer formed over the second insulating layer. Each of the first and second trapping layers includes one or more traps. The one or more traps of the first and second trapping layers are configured to capture or release one or more carriers flowing through the channel region. In response to an applied signal to the transistor, the random noise signal is generated as a function of the one or more carriers being captured or released by the one or more traps. A random probability distribution of the random noise signal of one of the random number signal generators is different from a random probability distribution of the random noise signal of another of the random number signal generators.

DETAILED DESCRIPTION OF THE PREFERRED EMBODIMENTS

Embodiments of the present invention will now be described in detail on the basis of the drawings. However, the following embodiments do not restrict the invention claimed in the claims. Moreover, all combinations of features described in the embodiments are not necessarily mandatory for the architecture of the present invention. The same numbers are assigned to the same components throughout the description of the embodiments of the present invention.

Figure 1A:
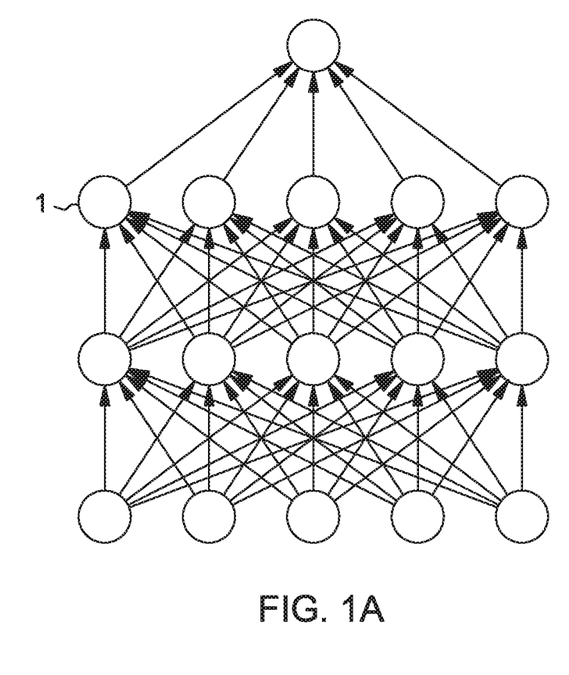
FIG. 1A illustrates an example of a standard neural network with two hidden layers.
Figure 1B:
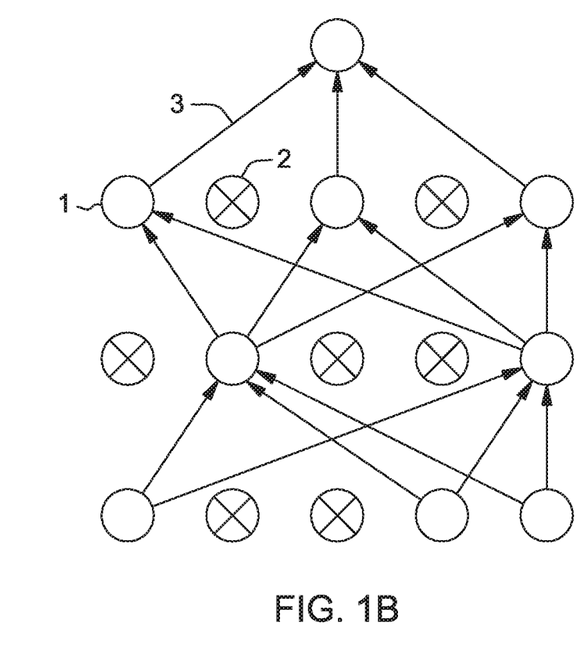
FIG. 1B illustrates an example of a thinned network produced by applying dropout to the network of FIG. 1A.

FIGS. 1A and 1B illustrate examples of dropout neural network (NN) model. FIG. 1A illustrates an example of a standard NN with 2 hidden layers. FIG. 1B illustrates an example of a thinned network produced by applying dropout to the network of FIG. 1A.

"Dropout" refers to "dropping out" units (e.g., hidden or visible units) in a neural network. In the neural network, since a fully connected layer occupies most of parameters, it is prone to overfitting. The dropout technique is used to prevent the overfitting and improve the speed of training. At each training stage, individual nodes are either "dropped out" of the network with probability of e.g., (1−p) or kept with probability of e.g., p. By dropping a node (e.g., 2) out, the node may temporarily be removed from the network, along with all its incoming and outgoing connections, as shown in FIG. 1B. The reference numerals 1 and 2 represent respectively, a node which has not been dropped out and a node which has been dropped out.

Figure 2A:
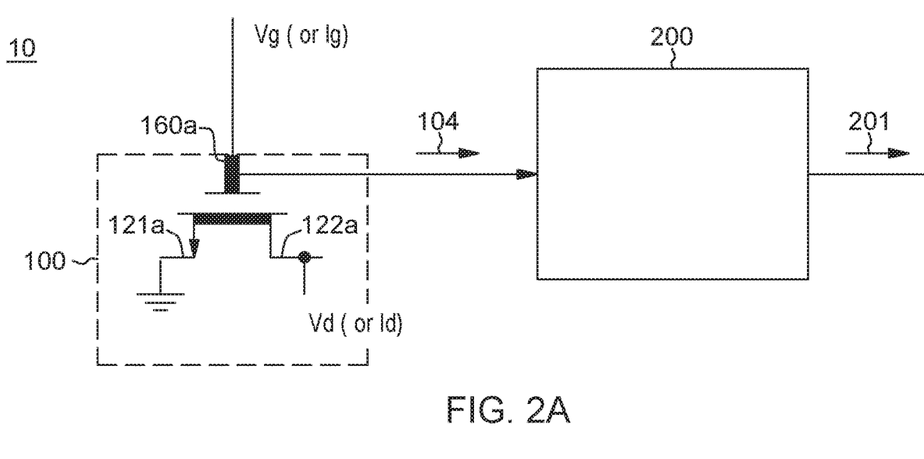
FIG. 2A illustrates a circuit diagram of a true-random number generator (TRNG) according to a non-limiting exemplary embodiment of the present disclosure.
Figure 2B:
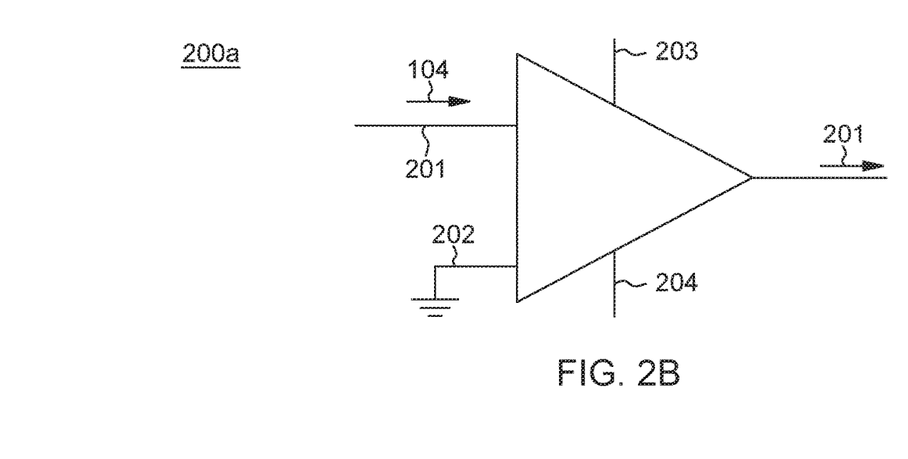
FIG. 2B illustrates a diagram of an amplifying circuit for amplifying an output signal of a random noise signal generator according to a non-limiting exemplary embodiment of the present disclosure.
Figure 3:
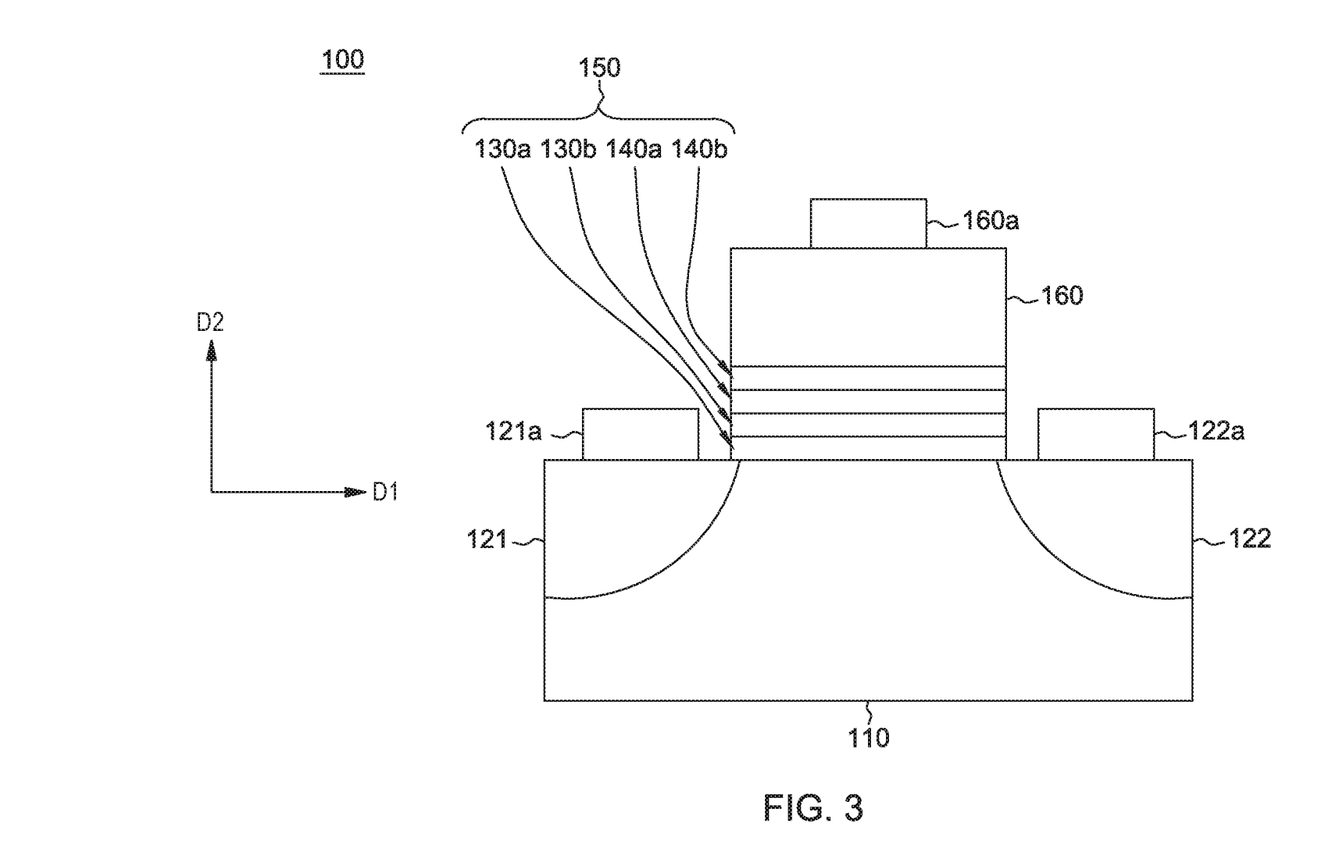
FIG. 3 illustrates a cross-sectional view taken along a channel length direction of the random noise signal generator serving as the random telegraph noise (RTN) signal source according to a non-limiting exemplary embodiment of the present disclosure.
Figure 4:
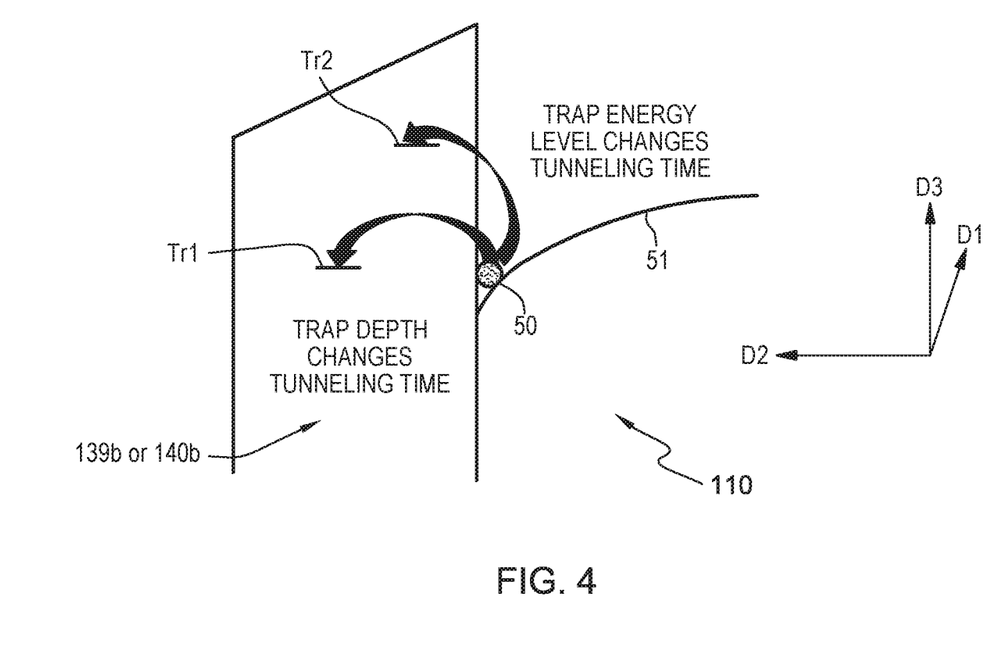
FIG. 4 is an example of an energy band diagram illustrating a trap depth and a trap energy level according to a non-limiting exemplary embodiment of the present disclosure.

FIG. 2A illustrates a circuit diagram of a true-random number generator (TRNG) 10 according to a non-limiting exemplary embodiment of the present disclosure. FIG. 2B illustrates a diagram of an amplifying circuit 200a for amplifying an output signal of a random noise signal generator 100 according to a non-limiting exemplary embodiment of the present disclosure. FIG. 3 illustrates a cross-sectional view taken along a channel length direction of the random noise signal generator 100 serving as the random telegraph noise (RTN) signal source according to a non-limiting exemplary embodiment of the present disclosure. FIG. 4 is an energy band diagram illustrating a trap depth and a trap energy level according to a non-limiting exemplary embodiment of the present disclosure.

Referring to FIG. 2A, the TRNG 10 may include a random noise signal generator 100, implemented using a transistor, and an amplifying circuit 200a for amplifying a random noise signal output from the random noise signal generator 100.

In one embodiment, the random noise signal generator 100 may be configured to generate a random telegraph noise (RTN) signal. In one embodiment, the transistor 100 may be an n-channel metal oxide semiconductor field effect transistor (MOSFET) or a p-channel MOSFET. Although the random noise signal generator 100 is illustrated in FIGS. 2A and 3 as the n-channel MOSFET for the purpose of illustration, the present disclosure is not limited thereto, and the random noise signal generator 100 may include any transistor which is capable of generating the RTN signal. For example, when a channel region and a gate dielectric layer of the random noise signal generator 100 has small enough dimensions (e.g., a channel length ≤40 nm, a channel width ≤70 nm and a thickness of the gate dielectric layer ≤2.5 nm), there may occur carrier tunneling between the channel region and traps in the gate dielectric layer. The RTN signal may be generated when charge carriers (e.g., electrons or holes) in the channel region are captured or released by the traps in the gate dielectric layer. This RTN signal is used as a source for generating the random number signals for performing dropout and weight initialization in the neural network.

Referring back to FIG. 2A, the random noise signal generator 100 may include a source contact electrode 121a connected to a ground, a drain contact electrode 122a to which a drain voltage source Vd is applied, and a gate contact electrode 160a to which a gate voltage source Vg is applied.

In one embodiment, a random noise signal 104 (e.g., RTN signal) may be generated and output from the gate contact electrode 160a, as shown in FIG. 2A, and input to the amplifying circuit 200. The amplifying circuit 200 may output the amplified random noise signal 104 as a random number signal 201.

Referring to FIG. 2B, in one embodiment, the amplifying circuit 200 may be a low noise amplifier configured to include one input node 201 for receiving the random noise signal 104 and the other input node 202 connected to the ground. The amplifying circuit 200 may be supplied with voltages through nodes 203 and 204. However, exemplary embodiments of the amplifying circuit 200 of the present disclosure are not limited thereto.

Referring to FIG. 3, in one embodiment, the random noise signal generator 100 may include a semiconductor substrate 110, a source region 121 formed in the substrate 110, and a drain region 122 formed in the substrate 110, a carrier trapping structure 150 formed on a channel region (not shown) (e.g., on a top surface of the substrate 110) between the source region 121 and the drain region 122, a gate conductive layer 160 formed on the carrier trapping structure 160. Directions D1 and D2 depicted in FIG. 3 represent respectively a channel length direction in which carriers (e.g., electrons or holes) flow and a direction in which the elements 110, 160, and 150 are formed. In addition, a source contact electrode 121a may be formed on the source region 121, a drain contact electrode 122a may be formed on the drain region 121, and the gate contact electrode 160a may be formed on (or in) the gate conductive layer 160.

In one embodiment, the semiconductor substrate 110 may include, but not limited to, silicon (Si), a gallium arsenide (GaAs), a chemical compound of silicon and germanium (SiGe), etc.

In one embodiment, if the random noise signal generator 100 is implemented with an n-channel MOSFET, each of the source and drain regions 121 and 122 may be an n-type semiconductor formed by doping n-type dopant (e.g., phosphorus) and the semiconductor substrate 110 may be a p-type semiconductor formed by doping p-type dopant (e.g., boron). In addition, in one embodiment, if the random noise signal generator 100 is implemented with a p-channel MOSFET, each of the source and drain regions 121 and 122 may be a p-type semiconductor formed by doping p-type dopant (e.g., boron) and the semiconductor substrate 110 may be a n-type semiconductor formed by doping n-type dopant (e.g., phosphorus).

In one embodiment, the carrier trapping structure 150 may include a first insulating layer 130a disposed on the channel region, a first trapping layer 130b disposed on the first insulating layer 130a, a second insulating layer 140a disposed on the first trapping layer 130b, and a second trapping layer 140b disposed on the second insulating layer 140a. In one embodiment, the first trapping layer 130b may be disposed in the first insulating layer 130a, and the second trapping layer 140b may be disposed in the first insulating layer 140a.

In one embodiment, each of the first and second insulating layers 130a and 140a may have a thickness of e.g., 0.5 to 10 nm which depends on gate length and oxide material. In one embodiment, each of the first and second insulating layers 130a and 140a may be a dielectric layer including such as silicon dioxide ($SiO_2$) with a dielectric constant of, e.g., 3.5 to 20, "high-K" materials (e.g., $HfO_2$) with a dielectric constant of, e.g., 11, etc. In one embodiment, the gate conductive layer 160 may include, but not limited to, polysilicon, other doped semiconductor materials, or metals such as aluminum, copper or tungsten.

In one embodiment, the first insulating layer 130a and the first trapping layer 130b may be formed of substantially the same materials, and the second insulating layer 140a and the second trapping layer 140b may be formed of substantially the same materials. In one embodiment, a length and a width of the channel region of the random noise signal generator 100 may be, for example, 40 nm and 70 nm, respectively.

The materials, dielectric constants, device dimensions (e.g., thickness, length) described above in the exemplary embodiments are only examples. Exemplary embodiments of the present disclosure are not limited thereto. A wide variety of combinations in the materials, dielectric constants, device dimensions, or the like can also be used for the layers and structure of the random noise signal generator 100.

Although it is illustrated in FIG. 3 that the random noise signal generator 100 includes two trapping layers 130b and 140b, exemplary embodiments of the present disclosure are not limited thereto. In one embodiment, the random noise signal generator 100 may include only one trapping layer or N trapping layers. Here, N is a positive integer greater than two.

In one embodiment, each trapping layer (e.g., 130b or 140b) may include at least one trap (e.g., one or two). When the gate voltage Vg greater than a threshold value is applied and carriers such as electrons or holes flow through the channel region, there may occur carrier tunneling across the insulating layers 130a and 140a from the channel region to the traps in the trapping layers 130b and 140b, and thus, carriers may be captured and/or released by the traps in the trapping layers 130b and 140b. Due to capture or release of the carriers by the traps, a gate current Ig (or a drain current Id) output through the gate contact electrode 160 (or the drain contact electrode 122a) may fluctuate in magnitude. For example, capture of a carrier by a trap may decrease the gate current Ig (or the drain current Id), and release of a carrier by a trap may increase the gate current Ig (or the drain current Id).

The "carrier tunneling time" is related to times that the gate current Ig (or the drain current Id) stays in a high level or a low level. For example, the "carrier tunneling time" is related to how often the gate current Ig (or the drain current Id) transitions between the high level and the low level. This different transition rate between the high and low levels of the gate current Ig (or the drain current Id) may result in different random probability distribution (e.g., probability density function (PDF)). For example, the random probability distribution of the RTS signal may be controlled by changing the carrier tunneling time.

In one embodiment, the carrier tunneling time may be changed according to a location of a trap such as a trap depth or a trap energy level. As shown in FIG. 4, the trapping layers (e.g., 130b or 140b) may include traps Tr1 and Tr2 in different locations. Although the insulating layer (e.g., 130a or 140a) is not shown in FIG. 4 for the purpose of illustration, the insulating layer may be disclosed between the trapping layer (e.g., 130a or 140a) and the channel region. However, exemplary embodiments of the present disclosure are not limited thereto. The trap depth refers to how far the trap is located from the channel region where a carrier (e.g., hole or electron) 50 flows. The trap energy level refers to how high the trap is located from a Fermi energy level (Ef). A rightmost portion of FIG. 4 may be the semiconductor substrate 110. A direction D3 depicted in FIG. 4 represents a direction in which an energy level increases. If the trap depth and/or the trap energy level is increased, the carrier tunneling time may be decreased (or vice versa). The trap depth may be changed by changing a thickness or one or more materials of the insulating layer (e.g., 130a or 140a). For example, if the insulating layer becomes thinner, the carrier tunneling time may be decreased, and thus, the transition rate between the high and low levels of the gate current Ig (or the drain current Id), which is, for example, the RTS signal, may be higher. The curved line 51 may represent a conduction band.

In one embodiment, the carrier tunneling time may be changed according to the gate voltage Vg applied to the gate contact electrode 160a.

Figure 5:
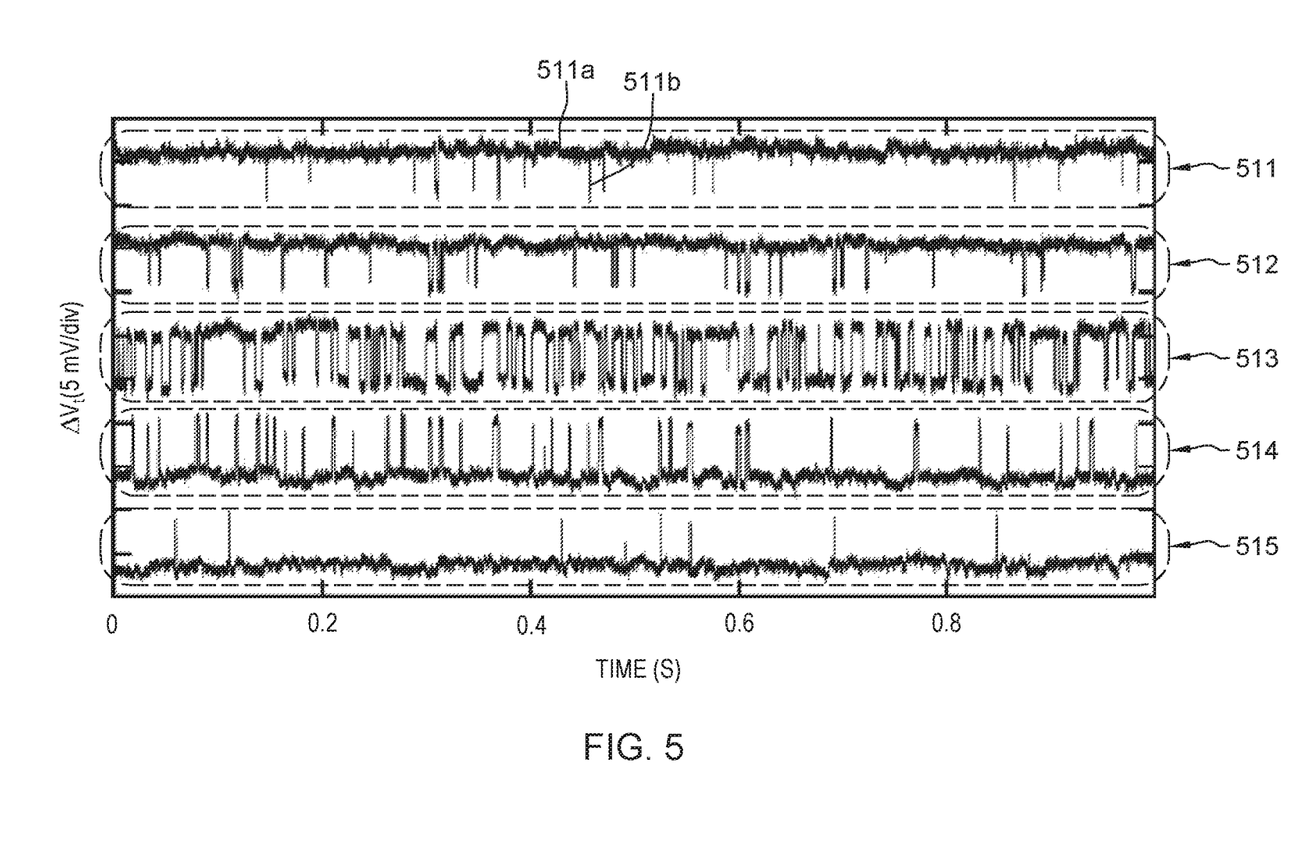
FIG. 5 illustrates examples of threshold voltage shifts changed according to a gate voltage according to a non-limiting exemplary embodiment of the present disclosure.

FIG. 5 illustrates examples of threshold voltage shifts changed according to a gate voltage Vg according to a non-limiting exemplary embodiment of the present disclosure.

Referring to FIG. 5, a threshold voltage Vt may change when a carrier is captured and released by a trap. For example, in a plot 511 of FIG. 5, a waveform 511a may correspond to a state when a carrier is captured by a trap and the threshold voltage Vt remains high, and a waveform 511b may correspond to a state when the carrier is released from the trap and the threshold voltage Vt is shifted to a low level. Accordingly, the threshold voltage shifts shown in FIG. 5 may be given as a result of capture or release of a carrier(s). If the gate voltage Vg is increased in an order from the plot 511 to 515, the time in which the carrier stay captured by the trap may become shorter. Thus, the transition rate between the high and low levels of the gate current Ig (or the drain current Id), thereby causing changes in random probability distribution (e.g., probability density function (PDF)).

Figure 6A:
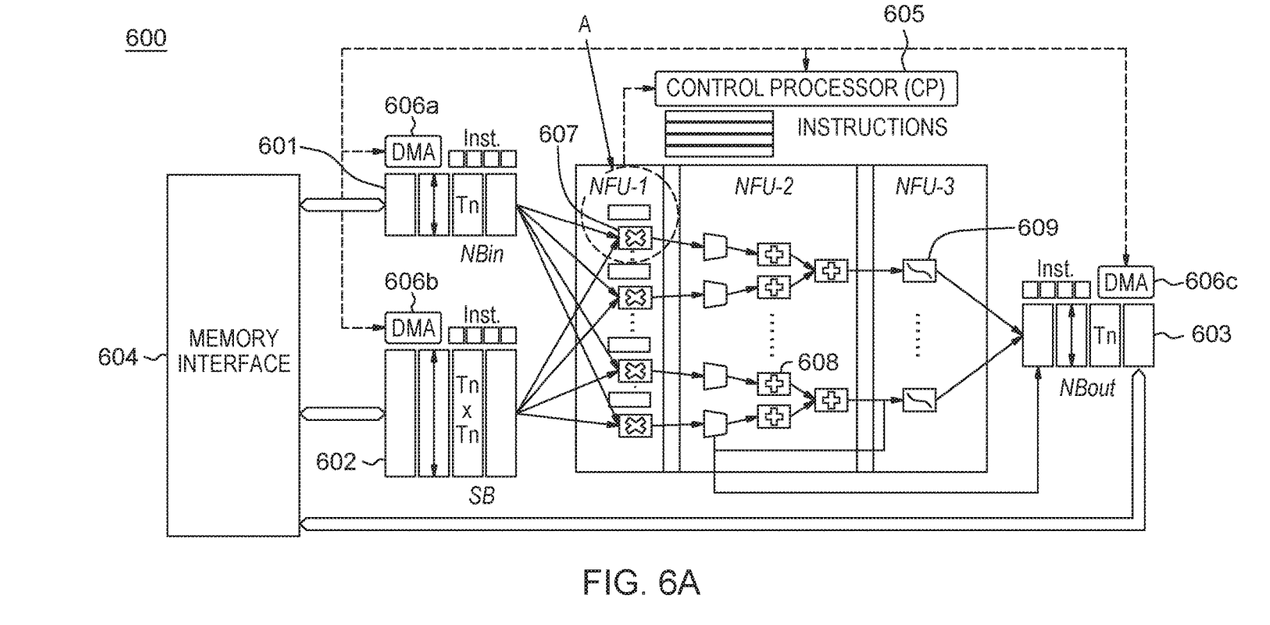
FIG. 6A illustrates an example of a pipeline-based neural network in which the TRNG is used according to a non-limiting exemplary embodiment of the present disclosure.
Figure 6B:
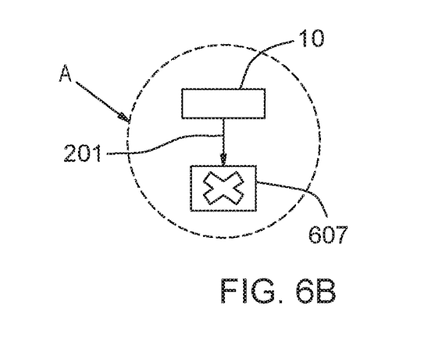
FIG. 6B is an exploded diagram of a portion A of FIG. 6A according to a non-limiting exemplary embodiment of the present disclosure.
Figure 7:
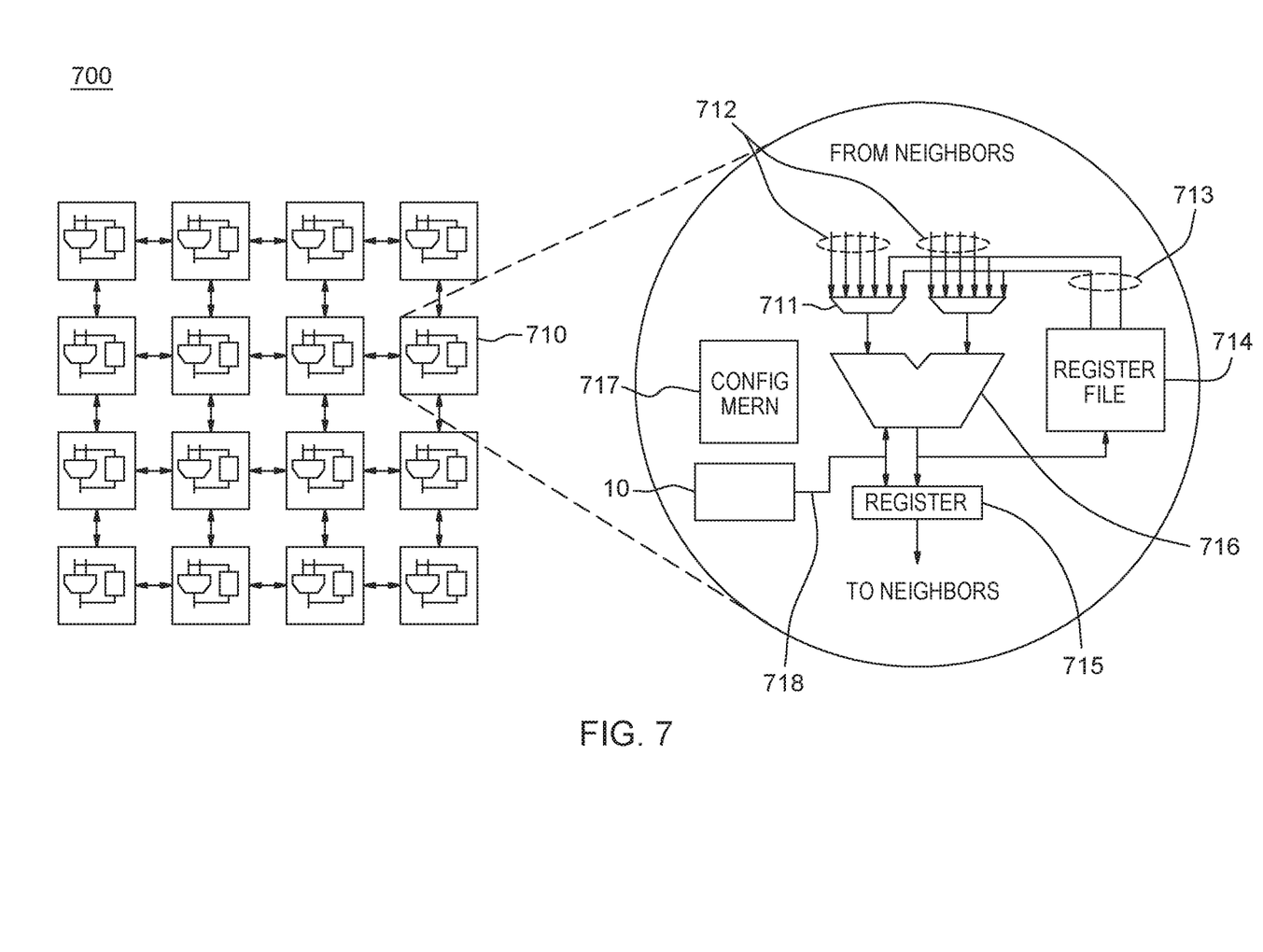
FIG. 7 illustrates an example of in a course grained reconfigurable architectures (CGRA)-based neural network in which the TRNG is used according to a non-limiting exemplary embodiment of the present disclosure.

FIG. 6A illustrates an example of a pipeline-based neural network 600 in which the TRNG 10 is used according to a non-limiting exemplary embodiment of the present disclosure. FIG. 6B is an exploded diagram of a portion A of FIG. 6A according to a non-limiting exemplary embodiment of the present disclosure. FIG. 7 illustrates an example of in a course grained reconfigurable architectures (CGRA)-based neural network 700 in which the TRNG 10 is used according to a non-limiting exemplary embodiment of the present disclosure.

Referring to FIG. 6A, the pipeline-based neural network 600 may include a plurality of neural functional units (NFUs) NFU-1 to NFU-3, a plurality of buffers 601 to 603, a memory interface 604, a control processor 605, a plurality of direct memory accesses (DMA) 606a to 606c assigned to each of the buffers 601 to 603. Data may be provided to the input buffers 601 and 603 of the pipeline-based neural network 600 through the memory interface 604. The buffer 601 (e.g., NBin) may be an input buffer for input neurons. The buffer 602 (e.g., SB) may be an input buffer for input synaptic weights. The buffer 603 (e.g., NBout) may be an output buffer for output neurons. The buffers 602 and 603 may be connected to a computational block in the neural functional unit NFU-1. The neural functional unit NFU-1 may include a plurality of multiplier nodes 607 which perform multiplication on the input neurons and the synaptic weights. The neural functional unit NFU-2 may include a plurality of adder nodes 608 which perform addition on the data provided from the neural functional unit NFU-1. The neural functional unit NFU-3 may include a plurality of nonlinear functional nodes 609 such as sigmoid, etc. The control processor 605 may be connected to each neural functional unit NFU-1, etc. and the plurality of buffers 601 to 603.

Since the configuration and concept of the pipeline-based neural network shown in FIG. 6A is well known and disclosed in detail in a technical paper: T. Chen et al., "DianNao: A small-footprint high-throughput accelerator", architectural support for programming languages and operating systems, 2014 (see http://pages.saclay.inria.fr/olivier-.temam/files/eval/CDSWWCT14.pdf), further detailed descriptions thereof will be omitted.

In one embodiment, each of the TRNGs 10 may be disposed to a corresponding one of the plurality of multipliers nodes 607 as shown in FIG. 6A. FIG. 6B is an exploded diagram of a portion A of FIG. 6A according to a non-limiting exemplary embodiment of the present disclosure. As shown in FIG. 6B, in one embodiment, the random number signal 201 output from the TRNG 10 may be provided to the corresponding multipliers node 607. In one embodiment, if the random number signal 201 is at a high level (e.g., a logic 1), the corresponding multiplication node 607 may be dropped out (e.g., the corresponding multiplication node 607 may be disabled or turned on). On the other hand, if the rand number signal 201 is at a low level (e.g., a logic 0), the corresponding multiplication node 607 might not be dropped out (e.g., the corresponding multiplication node 607 might not be disabled or stay turned on).

In one embodiment, the TRNGs 10 are configured to provide random number signals whose random probability distributions are different with respect to all of the multiplier nodes 607, so that the random number signals used for dropping out the nodes (e.g., 607) are stochastically independent one from another and eliminates or minimize correlation between the generated random number signals. To this end, as described above, the random probability distributions of the random number signals each can be controlled using at least one of a magnitude of the gate voltage Vg, one or more materials constituting the insulating layer 130a or 140a, and a thickness of the insulating layer 130a or 140a.

Further, although not shown in FIG. 6A, each of the TRNGs 10 may be disposed in a corresponding output nodes of the neural functional unit NFU-2 for weight initialization.

In one embodiment, each of the TRNGs 10 may be used for performing dropout and/or weight initialization in a course grained reconfigurable architectures (CGRA)-based neural network. As known, the CGRA-based neural network includes an array of light weight functional units called processing elements (PEs) which are interconnected with each other via some sort of interconnect network (e.g., mesh, hypercube, star, NoC, etc.).

In one embodiment, referring to FIG. 7, each of the TRNGs 10 may be disposed in a corresponding PE 710 of the CGRA-based neural network 700. Particularly, FIG. 7 illustrates 4×4 CGRA design that includes 16 PEs 710 arranged in a 4×4 mesh. Each PE 710 may communicate with its four nearest neighbors. Data may be received through multiplexers 711 from other PEs 710 along paths 712 and each PE 710 may receive data from itself via internal paths 713 from a register file 714. Each PE 710 may include a floating point unit (FU) 716 which reads inputs from neighbors, write to a single output register 715, and feedback the outputs thereof to the multiplexer 711 through the register file 714. A configuration memory 717 of each PE 710 may supply control signals for multiplexers 711, the FU 716, and the register file 714.

In one embodiment, each of the TRNGs 10 may be disposed in a corresponding one of the PEs 710 as shown in FIG. 7. In one embodiment, each TRNG 10 may be connected to the FU 716 and the output register 715 along paths 718. For example, if the random number signal 201 is at a high level (e.g., a logic 1), the corresponding PE 710 may be dropped out, in addition, if the random number signal 201 is at a low level (e.g., a logic 0), the corresponding PE 710 might not be dropped out (e.g., stay enabled). In one embodiment, if the corresponding PE 710 is dropped out, the FU 716 may be bypassed (or not executed) and the output register 715 may output zero signals for power saving.

In one embodiment, the TRNGs 10 are configured to provide random number signals whose random probability distributions are different with respect to all of the PEs 710, so that the random number signals used for dropping out the nodes (e.g., 607) are stochastically independent one from another and eliminates or minimize correlation between the generated random number signals. To this end, as described above, the random probability distributions of the random number signals each can be controlled using at least one of a magnitude of the gate voltage Vg, one or more materials constituting the insulating layer 130a or 140a, and a thickness of the insulating layer 130a or 140a.

Further, although not shown in FIG. 7, each of the TRNGs 10 may be disposed in a corresponding PE 710 of the CGRA-based neural network for weight initialization.

The neural networks shown in FIGS. 6A, 6B, and 7 in which the TRNG 10 is used are only examples and are not intended to limit the present invention thereto.

Figure 8:
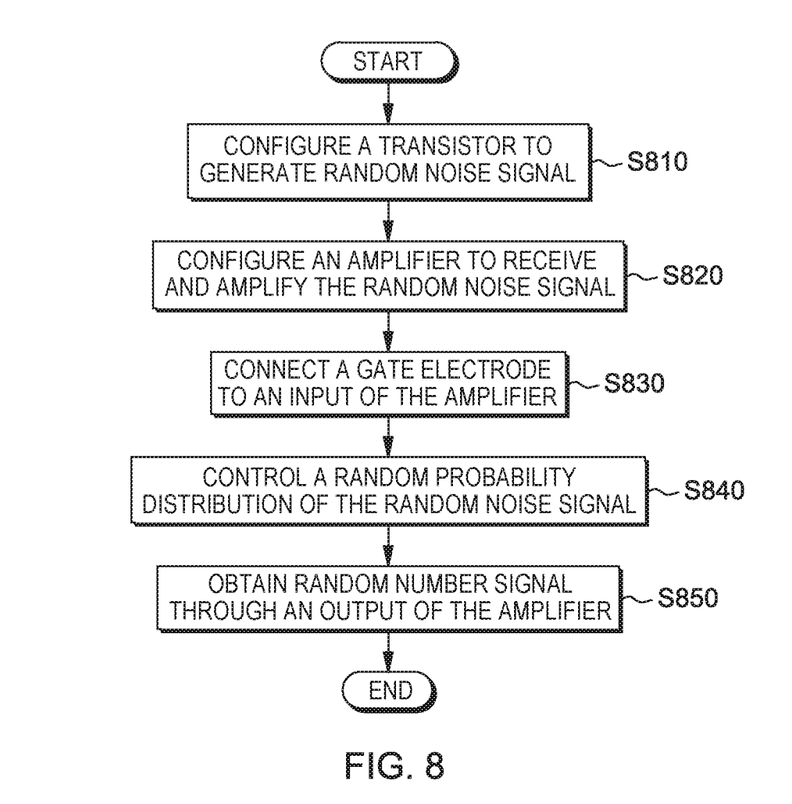
FIG. 8 is a flow chart illustrating a method for generating random number signals used for performing dropout or weight initialization at a plurality of nodes within a neural network.

FIG. 8 is a flow chart illustrating a method for generating random number signals used for performing dropout or weight initialization at a plurality of nodes within a neural network.

Referring to FIG. 8, the method according to an exemplary embodiment may include: forming a transistor (e.g., 100) which generates a random noise signal (e.g., 104) in an operation of S810; forming an amplifying circuit (e.g., 200) for amplifying the random noise signal in an operation of S820 by connecting a gate contact electrode (e.g., 160a) to an input (e.g., 201) of the amplifying circuit (S830); controlling a random probability distribution of the random noise signal in an operation of S840; and obtaining the random number signals through an output (e.g., 201) of the amplifying circuit.

In one embodiment, instead of the gate contact electrode (e.g., 160a), a drain contact electrode (e.g., 122a) of the transistor (e.g., 100) may be selected to obtain the random noise signal. In this case, in the operation of S830, the drain contact electrode of the transistor may be connected to the input of the amplifying circuit.

In the operation of S840, the random probability distribution of the random noise signal may be controlled by at least one of a magnitude of a gate voltage Vg applied to the gate contact electrode, one or more materials formed in the insulating layers 130a or 140a, and a thickness of each of the insulating layers 130a or 140a.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A random number signal generator for generating a random number signal used for performing dropout or weight initialization for a node in a neural network, the random number signal generator including a transistor which generates a random noise signal, wherein the transistor comprises:
a substrate;
a source region formed in the substrate, a source contact electrode is formed on the source region;
a drain region formed in the substrate, a drain contact electrode is formed on the drain region, the drain region being separated from the source region through a channel region, the channel region is formed on a top surface of the substrate;
a first insulating layer formed over the channel region;
a first trapping layer formed over the first insulating layer, the first trapping layer including one or more traps;
a second insulating layer formed over the first trapping layer;
a second trapping layer formed over the second insulating layer, the second trapping layer including one or more traps;
a gate conductive layer formed over the second trapping layer, a gate contact electrode being formed on the gate conductive layer,
wherein the one or more traps of the first and second trapping layers are configured to capture or release one or more carriers flowing through the channel region,
wherein in response to an applied signal, the random noise signal is generated as a function of the one or more carriers being captured or released by the one or more traps,
wherein a random probability distribution of the random noise signal is controlled using a magnitude of a gate voltage signal applied to the gate contact electrode.

2. The random number signal generator of claim 1, wherein the random noise signal is output as a gate voltage or a gate current at the gate contact electrode.

3. The random number signal generator of claim 1, wherein the random noise signal is output as a drain voltage or a drain current at the drain contact electrode.

4. The random number signal generator of claim 1, further comprising:
an amplifier circuit for amplifying the random noise signal.

5. The random number signal generator of claim 1, wherein the transistor is an n-channel metal oxide semiconductor field effect transistor (MOSFET) or a p-channel MOSFET.

6. The random number signal generator of claim 1, wherein the first and second insulating layers are different in at least one of the materials and the thickness.

7. The random number signal generator of claim 1, wherein the neural network comprises a pipeline-based neural network and a coarse grained reconfigurable architecture (CGRA)-based neural network.

8. The random number signal generator of claim 1, wherein the source contact electrode is coupled to a ground, and the drain contact electrode is coupled to a power source.

9. A method for generating a random number signal used for performing dropout or weight initialization at a node within a neural network, comprising:
configuring a transistor to generate a random noise signal, the transistor comprising:
a substrate;
source and drain region formed in the substrate, the drain region being separated from the source region through a channel region, the channel region is formed on a top surface of the substrate;
a first insulating layer formed over the channel region;
a first trapping layer formed over the first insulating layer, the first trapping layer including one or more traps;
a second insulating layer formed over the first trapping layer;
a second trapping layer formed over the second insulating layer, the second trapping layer including one or more traps;
a gate conductive layer formed over the second trapping layer,
wherein the one or more traps of the first and second trapping layers are configured to capture or release one or more carriers flowing through the channel region,
applying a signal to the transistor;
obtaining the random noise signal through at least one of a gate contact electrode formed in the gate conductive layer and a drain contact electrode formed in the drain region, wherein the random noise signal is generated as a function of the one or more carriers being captured or released by the one or more traps; and controlling a random probability distribution of the random noise signal using a magnitude of a gate voltage signal applied to the gate contact electrode.

10. The method of claim 9, further comprising:
amplifying the random noise signal using an amplifier circuit whose input node is coupled to the gate contact electrode or the drain contact electrode.

11. The method of claim 9, wherein the transistor is an n-channel metal oxide semiconductor field effect transistor (MOSFET) or a p-channel MOSFET.

12. The method of claim 9, wherein the first and second insulating layers are different in at least one of the materials and the thickness.

13. The method of claim 9, wherein the neural network comprises a pipeline-based neural network and a coarse grained reconfigurable architecture (CGRA)-based neural network.

14. The method of claim 9, wherein the source contact electrode is coupled to a ground, and the drain contact electrode is coupled to a power source.

15. A neural network accelerator having a plurality of nodes and a plurality of random number signal generators, wherein each of the random number signal generators is used for performing dropout or weight initialization for each of the nodes, wherein each of the random number signal generators comprises a transistor which generates a random noise signal, the transistor comprising:
a substrate;
a source region formed in the substrate, a source contact electrode being formed on the source region;
a drain region formed in the substrate, a drain contact electrode being formed on the drain region, the drain region being separated from the source region through a channel region, the channel region being formed on a top surface of the substrate;
a first insulating layer formed over the channel region;
a first trapping layer formed over the first insulating layer, the first trapping layer including one or more traps;
a second insulating layer formed over the first trapping layer;
a second trapping layer formed over the second insulating layer, the second trapping layer including one or more traps;
a gate conductive layer formed over the second insulating layer, a gate contact electrode being formed on the gate conductive layer,
wherein the one or more traps of the first and second trapping layers are configured to capture or release one or more carriers flowing through the channel region,
wherein in response to an applied signal to the transistor, the random noise signal is generated as a function of the one or more carriers being captured or released by the one or more traps, and
wherein a random probability distribution of the random noise signal of one of the random number signal generators is different from a random probability distribution of the random noise signal of another of the random number signal generators.

16. The neural network accelerator of claim 15, wherein the random noise signal is output as a gate voltage or a gate current at the gate contact electrode.

17. The neural network accelerator of claim 15, wherein a random probability distribution of the random noise signal is controlled using a magnitude of a gate voltage signal applied to the gate contact electrode.

18. The neural network accelerator of claim 15, wherein the transistor is an n-channel metal oxide semiconductor field effect transistor (MOSFET) or a p-channel MOSFET.

19. The neural network accelerator of claim 15, wherein the first and second insulating layers are different in at least one of the materials and the thickness.

20. The neural network accelerator of claim 15, wherein the neural network accelerator is implemented using at least one of architectures of a pipeline-based neural network and a coarse grained reconfigurable architecture (CGRA)-based neural network.

* * * * *